United States Patent [19]
Tsutsumi et al.

[11] Patent Number: 5,812,998
[45] Date of Patent: Sep. 22, 1998

[54] SIMILARITY SEARCHING OF SUB-STRUCTURED DATABASES

[75] Inventors: Yasuhiro Tsutsumi; Toshihiro Tashima; Hiroshi Nakajima, all of Kyoto, Japan

[73] Assignee: Omron Corporation, Kyoto, Japan

[21] Appl. No.: 624,411

[22] PCT Filed: Sep. 30, 1994

[86] PCT No.: PCT/JP94/01635
§ 371 Date: Mar. 29, 1996
§ 102(e) Date: Mar. 29, 1996

[87] PCT Pub. No.: WO95/09400
PCT Pub. Date: Apr. 6, 1995

[30] Foreign Application Priority Data

Sep. 30, 1993 [JP] Japan ................................ 5 265518

[51] Int. Cl.⁶ ........................................ G06F 17/30
[52] U.S. Cl. ........................................ 707/2
[58] Field of Search ................... 395/601, 602, 395/603, 605, 604; 707/2, 1, 3, 5

[56] References Cited

U.S. PATENT DOCUMENTS

| | | | |
|---|---|---|---|
| 4,839,853 | 6/1989 | Deerwester et al. ............ | 395/605 |
| 5,423,035 | 6/1995 | DePrez ............................ | 395/602 |
| 5,483,650 | 1/1996 | Pedersen et al. ............... | 395/602 |
| 5,544,352 | 8/1996 | Egger ............................. | 395/605 |
| 5,576,954 | 11/1996 | Driscoll ........................ | 395/603 |
| 5,600,829 | 2/1997 | Tsatalos et al. ................ | 395/602 |
| 5,619,709 | 4/1997 | Caid et al. ..................... | 395/794 |

FOREIGN PATENT DOCUMENTS

| | | |
|---|---|---|
| 63-223827 | 9/1988 | Japan . |
| 1-277932 | 11/1989 | Japan . |
| 2-19968 | 1/1990 | Japan . |
| 2-93767 | 4/1990 | Japan . |
| 3-290730 | 12/1991 | Japan . |
| 4-60768 | 2/1992 | Japan . |
| 4-355879 | 12/1992 | Japan . |

OTHER PUBLICATIONS

Supplementary European Search Report, Oct. 20, 1997.
Chang, Shi–Kuo and Wu–Haung, Cheng, "A methodology for Structured Database Decomposition", IEEE Transactions on Software Engineering; vol. SE–6:2, Mar 1980.
Subieta, K. and Rzeczkowski, W., "Query Optimization by Stored Queries", Proceedings of the Thirteenth international Conference on Very Large Databases: 1987 13th VLDB, pp. 369–380.

*Primary Examiner*—Paul R. Lintz
*Attorney, Agent, or Firm*—Dickstein Shapiro Morin & Oshinsky LLP

[57] ABSTRACT

A grouped data base 10 includes a plurality of sub-databases 10A, in which data have been stored, for respective ones of data sets having specific classification data ("male", "female", "annual income of 20,000,000 yen or more"). The grouped data base 10 is searched in accordance with a given search condition. Given search conditions are stored successively in a search-result data base 11. The sub-data bases 10A contained in the grouped data base 10 are reorganized so as to be in line with those given search conditions that have a high frequency of occurrence.

4 Claims, 14 Drawing Sheets

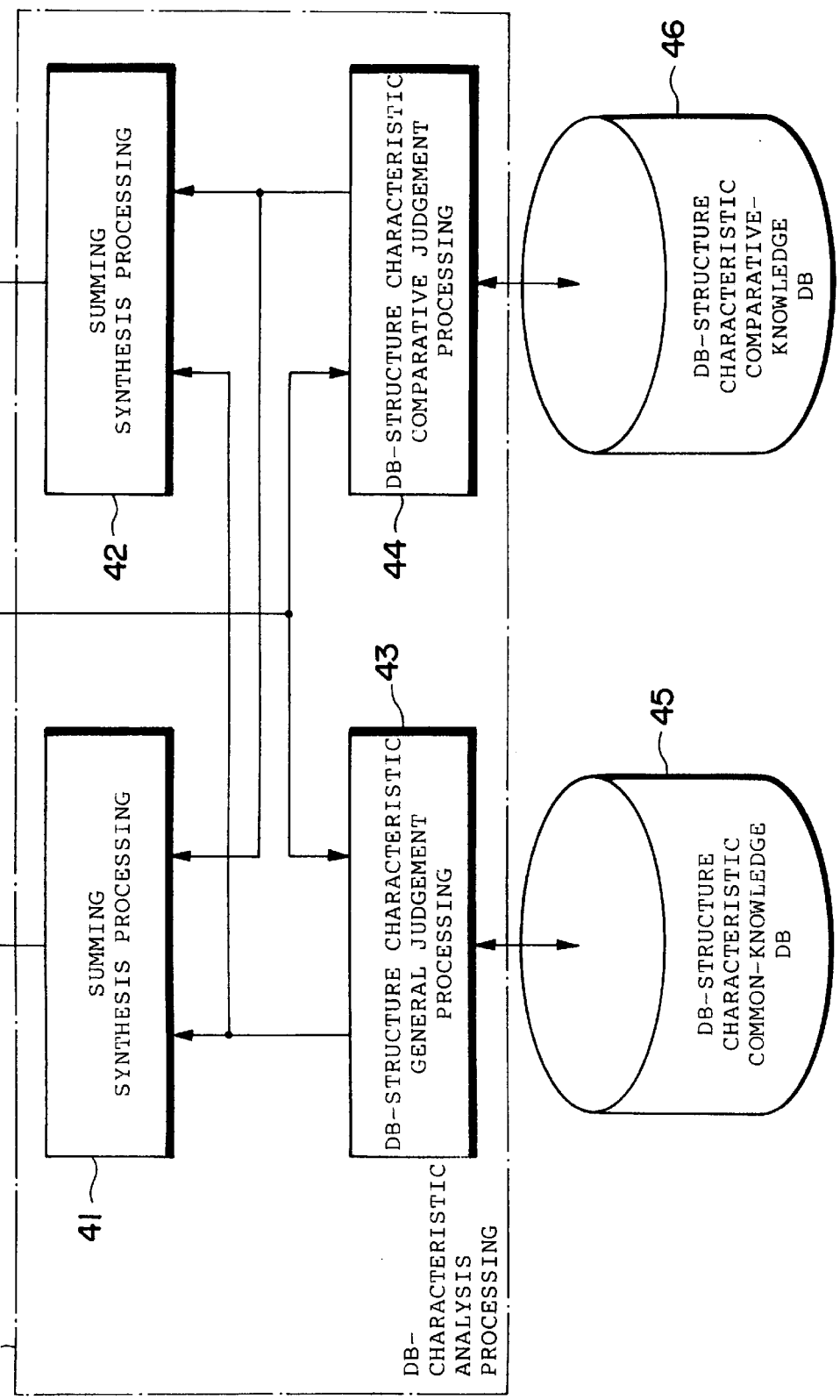

Fig. 5

| No. | NAME | SEX | OCCUPATION | ANNUAL INCOME |
|---|---|---|---|---|
| 1 | SUZUKI ○○ | MALE | COMPANY EMPLOYEE | 6,000,000 |
| 2 | SATO ○△ | FEMALE | GOVERNMENT EMPLOYEE | 4,500,000 |
| 3 | TANAKA ○× | MALE | SELF-EMPLOYED | 20,000,000 |
| 4 | ENDO □○ | FEMALE | COMPANY EMPLOYEE | 10,000,000 |
| 5 | KOJIMA □△ | MALE | GOVERNMENT EMPLOYEE | 5,500,000 |
| 6 | TAKAHASHI □× | FEMALE | COMPANY EMPLOYEE | 4,000,000 |
| 7 | AOKI △○ | FEMALE | SELF-EMPLOYED | 20,000,000 |
| 8 | KINOSHITA △△ | MALE | COMPANY EMPLOYEE | 10,000,000 |
| 9 | NAKAYAMA △× | MALE | GOVERNMENT EMPLOYEE | 10,000,000 |
| 10 | MATSUMOTO ×○ | FEMALE | COMPANY EXECUTIVE | 20,000,000 |
|  |  |  |  |  |

Fig. 6

| SEARCH NO. | 1963 |
|---|---|
| GROUPED DB STRUCTURE NO. | 12 |
| USER SEARCH CONDITION | <CONDITION> |
| NUMBER OF SEARCH-CONDITION EXECUTIONS | N |
| SEARCH CONDITION [0] | ANNUAL INCOME ≥ 10,000,000 |
| SEARCHED DB [0] | SEX MALE DB |
| PERTINENT NUMBER OF CASES [0] | 17 |
| SEARCH TIME [0] | 7.86 |
| SEARCH METHOD [0] | DIRECT |
| . . . . . . . . | . . . . . . |
| SEARCH CONDITION [n] | SEX = MALE |
| SEARCHED DB [n] | HIGH ANNUAL-INCOME DB |
| PERTINENT NUMBER OF CASES [n] | 402 |
| SEARCH TIME [n] | 10.92 |
| SEARCH METHOD [n] | SEQUENTIAL |
| . . . . . . . . | . . . . . . |
| TOTAL PERTINENT NUMBER OF CASES | 475 |
| TOTAL SEARCH TIME | 48.65 |

Fig.7

| GROUPED DB STRUCTURE NO. | | 12 |
|---|---|---|
| NUMBER OF DBs | | M |
| GROUPED DB STRUCTURE EVALUATION | | UNSUITABLE |
| DB STRUCTURE NO. 0 | DB NAME [0] | HIGH ANNUAL-INCOME DB |
| | NUMBER OF EXTRACTIONS [0] | J |
| | EXTRACTION OPERATION [0] | AND |
| | EXTRACTED CLASSIFICATION [0, 0] | ANNUAL INCOME ≥ 15,000,000 |
| | ⋮ | ⋮ |
| | EXTRACTED CLASSIFICATION [0, j] | SEX = * |
| | ...... | |
| ⋮ | ⋮ | ⋮ |
| DB STRUCTURE NO. m | DB NAME [m] | SEX MALE DB |
| | NUMBER OF EXTRACTIONS [m] | K |
| | EXTRACTION OPERATION [m] | AND |
| | EXTRACTED CLASSIFICATION [m, 0] | SEX = MALE |
| | ...... | |
| | EXTRACTED CLASSIFICATION [m, k] | ANNUAL INCOME < 15,000,000 |
| | ...... | |

Fig.8a

| No. | NAME | SEX | OCCUPATION | ANNUAL INCOME |
|---|---|---|---|---|
| 1 | SUZUKI ○○ | MALE | COMPANY EMPLOYEE | 6,000,000 |
| 2 | KOJIMA □△ | MALE | GOVERNMENT EMPLOYEE | 5,500,000 |
| 3 | KINOSHITA △△ | MALE | COMPANY EMPLOYEE | 10,000,000 |
| 4 | NAKAYAMA △× | MALE | GOVERNMENT EMPLOYEE | 10,000,000 |
| | | | | |

Fig.8b

| No. | NAME | SEX | OCCUPATION | ANNUAL INCOME |
|---|---|---|---|---|
| 1 | SATO ○△ | FEMALE | GOVERNMENT EMPLOYEE | 4,500,000 |
| 2 | ENDO □○ | FEMALE | COMPANY EMPLOYEE | 10,000,000 |
| 3 | TAKAHASHI □× | FEMALE | COMPANY EMPLOYEE | 4,000,000 |
| | | | | |

Fig.8c

| No. | NAME | SEX | OCCUPATION | ANNUAL INCOME |
|---|---|---|---|---|
| 1 | TANAKA ○× | MALE | SELF-EMPLOYED | 20,000,000 |
| 2 | AOKI △○ | FEMALE | SELF-EMPLOYED | 20,000,000 |
| 3 | MATSUMOTO ×○ | FEMALE | COMPANY EXECUTIVE | 20,000,000 |
| | | | | |

Fig.9a

| No. | NAME | SEX | OCCUPATION | ANNUAL INCOME |
|---|---|---|---|---|
| 1 | SUZUKI ○○ | MALE | COMPANY EMPLOYEE | 6,000,000 |
| 2 | KOJIMA □△ | MALE | GOVERNMENT EMPLOYEE | 5,500,000 |
| 3 | KINOSHITA △△ | MALE | COMPANY EMPLOYEE | 10,000,000 |
| 4 | NAKAYAMA △× | MALE | GOVERNMENT EMPLOYEE | 10,000,000 |
|  |  |  |  |  |

Fig.9b

| No. | NAME | SEX | OCCUPATION | ANNUAL INCOME |
|---|---|---|---|---|
| 1 | SATO ○△ | FEMALE | GOVERNMENT EMPLOYEE | 4,500,000 |
| 2 | ENDO □○ | FEMALE | COMPANY EMPLOYEE | 10,000,000 |
| 3 | TAKAHASHI □× | FEMALE | COMPANY EMPLOYEE | 4,000,000 |
|  |  |  |  |  |

Fig.9c

| No. | NAME | SEX | OCCUPATION | ANNUAL INCOME |
|---|---|---|---|---|
| 1 | TANAKA ○× | MALE | SELF-EMPLOYED | 20,000,000 |
| 2 | ENDO □○ | FEMALE | COMPANY EMPLOYEE | 10,000,000 |
| 3 | AOKI △○ | FEMALE | SELF-EMPLOYED | 20,000,000 |
| 4 | KINOSHITA △△ | MALE | COMPANY EMPLOYEE | 10,000,000 |
| 5 | NAKAYAMA △× | MALE | GOVERNMENT EMPLOYEE | 10,000,000 |
| 6 | MATSUMOTO ×○ | FEMALE | COMPANY EXECUTIVE | 20,000,000 |
|  |  |  |  |  |

SIMILARITY SEARCHING OF SUB-STRUCTURED DATABASES

TECHNICAL FIELD

This invention relates to a database management method and apparatus as well as a database search method and apparatus.

BACKGROUND ART

When a database having a table format is searched, generally use is made of a sequential search as the search method. A database having a table format includes a plurality of data sets which contain identification-code data for identifying the data sets and classification data with regard to respective ones of a plurality of items. The search of a database is conducted by giving the classification to be searched as a keyword. However, since the structure of a database having a table format is fixed, it is difficult to conduct a search at high speed.

There is an apparatus in which data having common items are collected together by a filing device, which correlates and files a plurality of data extending over a plurality of items, thereby creating group data, the group data are filed in a magnetic disk device, group data corresponding to a search command are selected when the search command has been applied, and data corresponding to the search command are extracted from the group data selected. (For example, see Japanese Patent Application Laid-Open No. 2-19968.)

However, the common items in the group data are fixed on a group-data basis even in such a file apparatus. As a consequence, when a new search command different from that of the common item is applied, a rapid search is difficult.

DISCLOSURE OF THE INVENTION

An object of the present invention is to shorten the time needed for searching and conduct a comparatively efficient database search.

A database management method according to a first aspect of the present invention is a method of organizing one or a plurality of sub-databases from an original database comprising a collection of data sets containing identification numbers and including classification data on an item-by-item basis, characterized by giving a search condition designating one or a plurality of classifications to be searched, and organizing the one or a plurality of sub-databases comprising a collection of data sets having the designated classification of the given search condition in common.

An apparatus for executing the method according to the first aspect of the invention also is provided. Specifically, the apparatus is an apparatus for managing an original database comprising a collection of data sets containing identification numbers and including classification data on an item-by-item basis, characterized by comprising an input unit for accepting a search condition designating one or a plurality of classifications to be searched, and sub-database organizing means for organizing one or a plurality of sub-databases comprising a collection of data sets having in common the designated classification of the given search condition accepted by the input unit.

In accordance with the first aspect of the invention, when a search condition is given, one or a plurality of sub-databases comprising a collection of data sets having the designated classification of the given search condition in common are organized. Accordingly, the next time the same search condition or a closely resembling search condition is given, search time is shortened and an efficient search can be conducted.

A database management method according to a second aspect of the invention is a method of reorganizing sub-databases when there is at least one of an original database comprising a collection of data sets containing identification codes and including classification data on an item-by-item basis, and one or a plurality of sub-databases, created based upon the original database, comprising a collection of data sets having a specific classification in common, characterized by storing designated classifications contained in a search condition whenever the search condition, which designates one or a plurality of classifications to be searched, is given, calculating degrees of similarity between designated classifications having a high frequency of occurrence among the stored designated classifications and a specific classification common to the sub-databases, and, in a case where there is a designated classification among the designated classifications having a high frequency of occurrence that exhibits a low degree of similarity with regard to any specific classification, creating a sub-database comprising a collection of data sets having this designated classification in common.

An apparatus for executing the method according to the second aspect of the invention also is provided. Specifically, the apparatus is an apparatus for managing a database which includes at least one of an original database comprising a collection of data sets containing identification codes and including classification data on an item-by-item basis, and one or a plurality of sub-databases, created based upon the original database, comprising a collection of data sets having a specific classification in common, characterized by comprising an input unit for accepting a search condition designating one or a plurality of classifications to be searched, memory means for storing designated classifications contained in a search condition whenever the search condition is accepted by the input unit, similarity calculating means for calculating degrees of similarity between designated classifications having a high frequency of occurrence among the designated classifications stored in the memory means and a specific classification common to the sub-databases, determination means for determining whether the designated classifications having a high frequency of occurrence include a designated classification that exhibits a low degree of similarity with regard to any specific classification in the degrees of similarity calculated by the similarity calculating means, and sub-database creating means which, when it has been determined by the determination means that the designated classifications having a high frequency of occurrence include a designated classification exhibiting a low degree of similarity with regard to any specific classification, is for creating a sub-database comprising a collection of data sets having the designated classification in common.

In accordance with the second aspect of the invention, if the stored designated classifications having a high frequency of occurrence include one which exhibits a low degree of similarity with regard to any specific classification, a sub-database comprising a collection of data sets having this designated classification in common is created. Accordingly, a specific classification common to the sub-databases will agree with that having a high frequency of designation in given search conditions.

The sub-database will be suited to the given search condition, search efficiency is improved and search time is shortened.

A database management method according to a third aspect of the invention is a method of reorganizing sub-databases when there are one or a plurality of sub-databases, created based upon an original database comprising a collection of data sets containing identification codes and including classification data on an item-by-item basis, comprising a collection of data sets having a specific classification in common, characterized by storing designated classifications contained in a search condition whenever the search condition, which designates one or a plurality of classifications to be searched, is given, calculating degrees of similarity between designated classifications having a high frequency of occurrence among the stored designated classifications and a specific classification common to the sub-databases, and, in a case where there is a designated classification among the designated classifications having a high frequency of occurrence that exhibits a low degree of similarity with regard to any specific classification, creating a first sub-database comprising a collection of data sets having this designated classification in common, and a second sub-database comprising a collection of all data sets not contained in the first sub-database but contained in the original database.

An apparatus for executing the method according to the third aspect of the invention also is provided. Specifically, the apparatus is an apparatus for managing a database which includes one or a plurality of sub-databases, created based upon an original database comprising a collection of data sets containing identification codes and including classification data on an item-by-item basis, comprising a collection of data sets having a specific classification in common, characterized by comprising an input unit for accepting a search condition designating one or a plurality of classifications to be searched, memory means for storing designated classifications contained in a search condition whenever the search condition is accepted by the input unit, similarity calculating means for calculating degrees of similarity between designated classifications having a high frequency of occurrence among the designated classifications stored in the memory means and a specific classification common to the sub-databases, determination means for determining whether the designated classifications having a high frequency of occurrence include a designated classification that exhibits a low degree of similarity with regard to any specific classification in the degrees of similarity calculated by the similarity calculating means, and sub-database creating means which, when it has been determined by the determination means that the designated classifications having a high frequency of occurrence include a designated classification exhibiting a low degree of similarity with regard to any specific classification, is for creating a first sub-database comprising a collection of data sets having this designated classification in common, and a second sub-database comprising a collection of all data sets not contained in the first sub-database but contained in the original database.

In accordance with the third aspect of the invention, all data sets contained in the original database are stored in the first sub-database and in the second sub-database so that loss of data sets contained in the original database is prevented.

A database search method according to a fourth aspect of the invention is characterized by searching a database, in which there is stored a data set containing an identification code and including classification data on an item-by-item basis, by giving a search condition which designates the classification of the data set and using a predetermined search method decided by the given search condition and the structure of the database, successively storing, whenever a search is conducted, the search condition, search method and time required for a search when a search is conducted, calculating degrees of similarity between a given search condition and stored search conditions when a search condition has been given, reading out a search method used when search time, required when a search was conducted under a search condition having a high calculated degree of similarity, is short, and searching the database by the search method read out and outputting the above-mentioned identification code of the data set having classification data conforming to the search condition.

An apparatus for executing the method according to the fourth aspect of the invention also is provided. Specifically, the apparatus comprises database searching means for searching a database, in which there is stored a data set containing an identification code and including classification data on an item-by-item basis, by giving a search condition which designates the classification of the data set and using a predetermined search method decided by the given search condition and the structure of the database, memory means for successively storing, whenever a search is conducted, the search condition, search method and time required for a search when a search is conducted by the data base search means, similarity calculating means for calculating degrees of similarity between a given search condition and search conditions, which have been stored in the memory means, when a search condition has been given, search-method readout means for reading out a search method used when search time, required when a search was conducted under a search condition having a high degree of similarity calculated by the similarity calculating means, is short, and identification-code output means for searching the database by the search method read out by the search-method readout means and outputting the above-mentioned identification code of the data set having classification data conforming to the search condition.

In accordance with the fourth aspect of the invention, the degree of similarity between a given search condition and the stored search condition is calculated, and a search is conducted employing a search method used when search time, which was required when a search was conducted under a search condition having a high calculated degree of similarity, is short.

Accordingly, a search is conducted by a comparatively suitable search method and the time required for the search is curtailed.

A database search method according to a fifth aspect of the invention is a search method for a case where there are one or a plurality of sub-databases, created based upon an original database comprising a collection of data sets containing identification codes and including classification data on an item-by-item basis, comprising a collection of data sets having a specific classification in common, wherein the sub-databases are reorganized, characterized by storing designated classifications contained in a search condition, search methods and times required for the searches whenever the search condition, which designates one or a plurality of classifications to be searched, is given, calculating degrees of similarity between designated classifications having a high frequency of occurrence among the stored designated classifications and a specific classification common to the sub-databases, in a case where there is a designated classification among the designated classifications having a high frequency of occurrence that exhibits a low degree of similarity with regard to any specific classification, creating a sub-database comprising a collection of data sets having this designated classification in common, storing a specific classification common to sub-databases whenever a sub-database is created, calculating designated-classification degrees of similarity between a designated classification contained in a given search condition and designated classifications that have been stored, calculating specific-classification degrees of similarity between a specific classification of a sub-database and specific classifications that have been stored, conducting a search of the above-mentioned sub-database by a search method used when the designated-classification degree of similarity and the specific-classification degree of similarity are high and the time required when a search was conducted at such time is short, and outputting the above-mentioned identification number of the data set having classification data conforming to the search condition.

An apparatus for executing the method according to the fifth aspect of the invention also is provided. Specifically, the apparatus is an apparatus for searching one or a plurality of sub-databases, created based upon an original database comprising a collection of data sets containing identification codes and including classification data on an item-by-item basis, comprising a collection of data sets having a specific classification in common, comprising an input unit for accepting a search condition designating one or a plurality of classifications to be searched, first memory means for storing designated classifications contained in a search condition, search methods and times required for the searches whenever the search condition is accepted by the input unit, first similarity calculating means for calculating degrees of similarity between designated classifications having a high frequency of occurrence among the designated classifications stored in the first memory means and a specific classification common to the sub-databases, determination means for determining whether the designated classifications having a high frequency of occurrence include a designated classification that exhibits a low degree of similarity with regard to any specific classification in the degrees of similarity calculated by the first similarity calculating means, sub-database creating means which, when it has been determined by the determination means that the designated classifications having a high frequency of occurrence include a designated classification exhibiting a low degree of similarity with regard to any specific classification, is for creating a sub-database comprising a collection of data sets having this designated classification in common, second memory means for storing a specific classification common to sub-databases whenever a sub-database is created by the sub-database creating means, second similarity calculating means for calculating degrees of similarity between a designated classification contained in a search condition entered by the input unit and designated classifications that have been stored in the first memory means, third similarity calculating means for calculating degrees of similarity between a specific classification of a sub-database and specific classifications that have been stored in the second memory means, and identification-number output means for conducting a search of the above-mentioned sub-database by a search method used when a designated-classification degree of similarity calculated by the second similarity calculating means and a specific-classification degree of similarity calculated by the third similarity calculating means are high and the time required when a search was conducted at such time is short, and outputting the above-mentioned identification number of the data set having classification data conforming to the search condition.

In accordance with the fifth aspect of the present invention, a search of the sub-database is conducted by a search method used when the designated-classification degree of similarity and the specific-classification degree of similarity are high and the time required for search performed at such time is short.

Accordingly, a search is conducted by a comparatively suitable search method and the time required for the search is curtailed in the fifth aspect of the invention as well.

BRIEF DESCRIPTION OF THE DRAWINGS

FIG. 4 illustrates the details of processing for analyzing the characteristics of a database;

FIG. 5 illustrates the content of original data that have been stored in a grouped database;

FIG. 6 illustrates the content of data that have been stored in a database in which results of a search are stored;

FIG. 7 illustrates the content of data that have been stored in a database-structure data base;

FIGS. 8a, 8b and 8c illustrate the content of data that have been stored a sub-database contained in a grouped database;

FIGS. 9a, 9b and 9c illustrate the content of data that have been stored a sub-database contained in a grouped database;

FIG. 14 illustrates part of a processing procedure for calculating the degree of similarity of database structures.

BEST MODE FOR CARRYING OUT THE INVENTION

Figure 1:
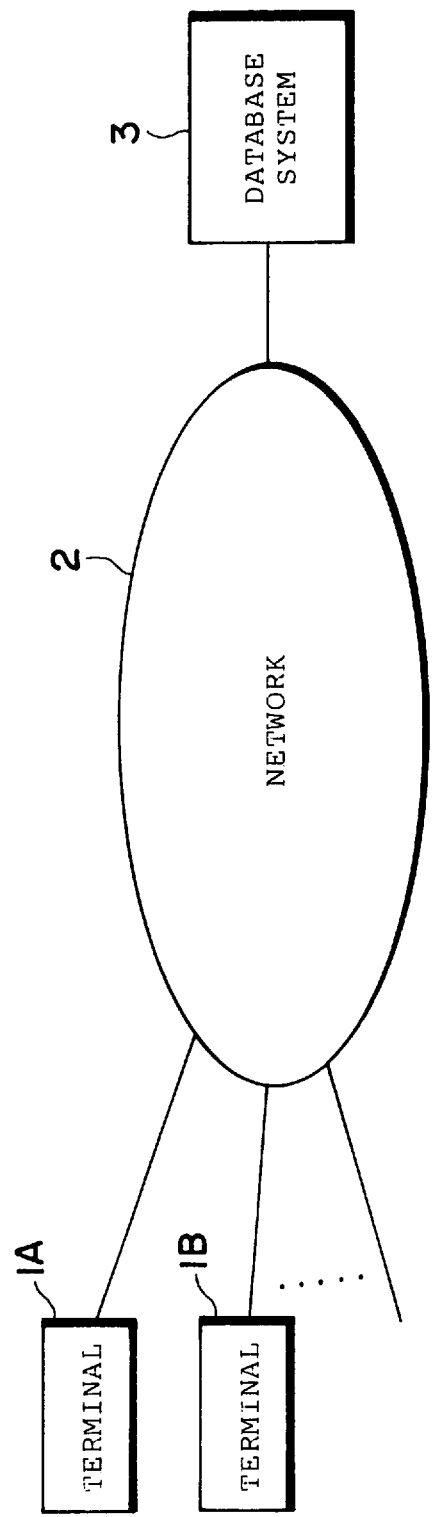
FIG. 1 illustrates a network system for searching a database.

FIG. 1 illustrates the network system of a database.

A plurality of terminal devices 1A, 1B, . . . are capable of being connected to a database system 3 via a network 2.

When a user applies a database search condition to the terminal device 1A etc., the search condition is applied to the database system 3 via the network 2. The database system 3 contains a database in which data corresponding to the search condition from the user are retrieved. The retrieved data are applied to the terminal device 1A etc. via the network 2, whence the data are provided to the user.

Figure 2:
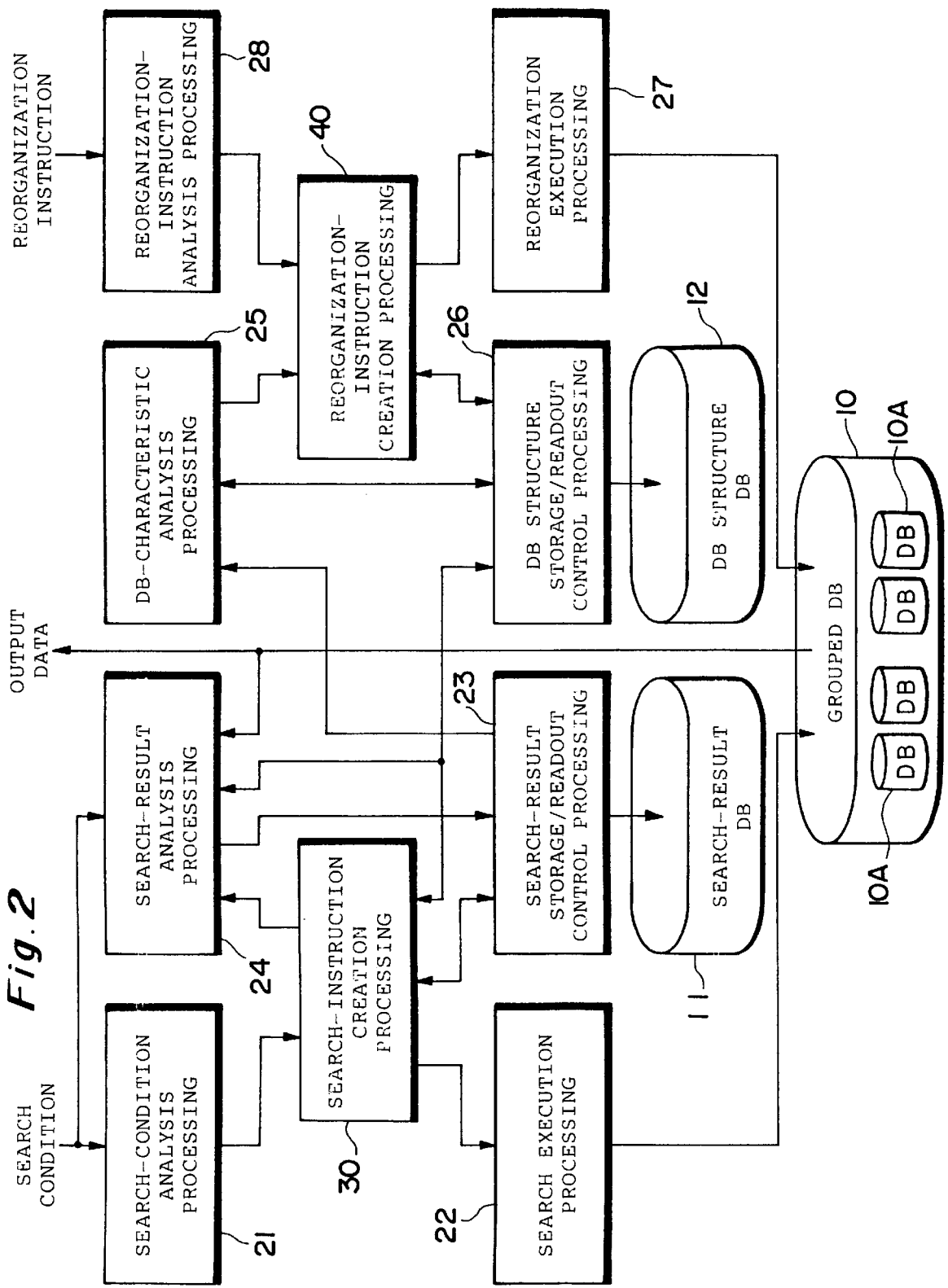
FIG. 2 illustrates the details of a database system.

FIG. 2 illustrates the database system 3 of such a database network system.

The system shown in FIG. 2 includes a grouped database 10, a search-result database 11 and a database-structure database 12.

The grouped database 10 is a database of a group of databases composed of one or a plurality of sub-databases 10A in which respective ones of data sets each containing an identification code and including classification data on an item-by-item basis are stored per data set having a specific classification in common. The database 10 is successively reorganized in a manner described later. At the very beginning the grouped database 10 is a single original database. For example, the grouped database 10 originally stores uncoordinated original data in which classifications such as male, female, company employee and government employee are included under each of such items as name, sex, occupation and annual income, as shown in FIG. 5. One set of data of names, sex, occupations and annual incomes in FIG. 5 is referred to as a "data set".

The grouped database 10 is constructed from the plurality of sub-databases 10A in response to the execution of a search, and the plurality of sub-databases are reorganized in accordance with the search.

For example, since the grouped database 10 is a single original database at the start, this single original database stores the uncoordinated data of the kind shown in FIG. 5. When a user subsequently applies a search condition "male", a search condition "female" and a search condition which includes a designated classification "annual income of 20,000,000 yen or more", etc., sub-databases 10A are created so as to store respective ones of data sets each of which has a common specific classification conforming to the respective search condition, as shown in FIGS. 8(A), (B), (C). Furthermore, if application of a search condition "annual income of 10,000,000 yen or more" occurs more frequently than application of the search condition "annual income of 20,000,000 yen or more" in the database search, then, among the databases 10A created in the manner set forth above, the database composed of the data set having the classification data "annual income of 20,000,000 yen or more" will be reorganized and a data set 10A composed of a data set having the classification data "annual income of 10,000,000 yen or more" will be created.

The prescribed search method used when each of the plurality of databases 10A contained in the grouped database 10 were searched, the search conditions, the search time required for the search and the results of the search are stored in the search-result database 11 successively per each search of the grouped database 10. An example of search results stored in the search-result database 11 is illustrated in FIG. 6.

In FIG. 6, Search No. indicates the number of times a search is performed. Grouped DB Structure No. specifies a database structure number that has been stored in the database-structure database 12, as will be described later. User Search Condition indicates the search condition which prevailed at the time of a data search. Further, data (Searched DB) representing the database used in a search of the grouped database 10, the pertinent number of cases, the time required for a search and the search method, etc., are stored in the search-result database 11 in correspondence with each database used in a search. In addition, the total number of pertinent cases of data in the entire grouped database 10 and the total search time required for the searches are stored in the search-result database 11.

The database-structure database 12 stores specific classifications common to data sets stored in the sub-databases 10A contained in the grouped database 10, the specific classifications representing the database structure. An example of data stored in the database-structure database 12 is illustrated in FIG. 7.

In FIG. 7, Grouped DB Structure No. specifies the data of the database structure. This corresponds to the number of times the grouped database 10 is reorganized. The data that have been stored in the database-structure database 12 are updated in response to reorganization of the grouped database 10.

The data that have been stored in the database-structure database 12 are stored in correspondence with individual databases of the plurality of sub-databases 10A contained in the grouped database 10. Examples of data that have been stored in individual databases of the plurality of sub-databases 10A contained in the grouped database 10 are illustrated in FIGS. 8a–8c. FIG. 8a illustrates some of the data that have been stored in a database storing a data set having the specific classification "male" for sex. FIG. 8b illustrates some of the data that have been stored in a database storing a data set having the specific classification "female" for sex. FIG. 8c illustrates some of the data that have been stored in a database storing a data set having the specific classification "20,000,000 yen or more" for annual income. In addition to these databases, the grouped database 10 includes auxiliary sub-databases that store data from which data, which have been stored in the databases 10A of the grouped database 10 in FIGS. 8a–8c, have been excluded from the original data illustrated in FIG. 5. As a result, the original data are maintained and never vanish. It should be noted, however, that since all of the original data are included owing to the data sets having the specific classifications "male" and "female" shown in FIGS. 8a and 8b, an auxiliary sub-database (second sub-database) is unnecessary.

With reference again to FIG. 2, a search condition which designates a classification to be searched is given by the user and the data representing this search condition is applied to search-condition analysis processing 21 (implemented by a program) and search-result analysis processing 24 (implemented by a program).

In search-condition analysis processing 21, the content of the search condition given by the user is ascertained and data representing the content of the search condition are applied to search-instruction creation processing 30 (implemented by a program).

In response to application of the data representing the content of the search condition to search-instruction creation processing 30, an instruction for searching the grouped database 10 is created in the search-instruction creation processing 30. More specifically, instructions for deciding search methods (e.g., sequential, direct, etc.) are created in correspondence with each of the plurality of sub-date bases 10A contained in the grouped database 10 are created. The details of this search-instruction creation processing will be described later.

A search instruction created in the search-instruction creation processing 30 is applied to search execution processing 22 (implemented by a program) and search-result storage/readout control processing 23 (implemented by a program).

By applying the search instruction to the search execution processing 22, the grouped database 10 is searched in accordance with the applied search condition and data conforming to the search condition are read out of the grouped database 10 and outputted.

The data from the grouped database 10 are not only outputted and provided to the user but also applied to the search-result analysis processing 24 (implemented by a program).

On the basis of the data outputted by the grouped database 10 owing to the search and the search instruction provided by the search-instruction creation processing 30, the search-result analysis processing 24 goes to the plurality of sub-databases 10A contained in the grouped database 10 to analyze the database utilized in the search, the search condition, the pertinent number of cases of the data, the time required for the search and the search method, etc. These analyzed data are applied to the search-result storage/readout control processing 23 (implemented by a program). The data analyzed in the search-result analysis processing 24 are applied to the search-result database 11 by the search-result storage/readout control processing 23 and are stored in the manner shown in FIG. 6.

The grouped database 10 is reorganized when reorganization of the sub-databases 10A currently included in the grouped database 10 is judged to be necessary. The data stored in the search-result database 11 as a result of this reorganization are read out by the search-result storage/readout control processing 23 and applied to database-characteristic analysis processing 25 (implemented by a program).

On the basis of the data that have been stored in the search-result database 11, the database-characteristic analysis processing 25 analyzes the characteristic of the structure of the sub-databases 10A currently in the grouped database 10, judges whether reorganization of the grouped database 10 is necessary and, when reorganization is necessary, applies data indicative of this fact to reorganization-instruction creation processing 40 (implemented by a program). The details of analytical processing in the database-characteristic analysis processing 25 will be described later.

Data representing an instruction for reorganizing the grouped database 10 are created in the reorganization-instruction creation processing 40 and applied to database structure storage/readout control processing 26 (implemented by a program) and reorganization execution processing 27 (implemented by a program).

The databases contained in the grouped database 10 are reorganized by the reorganization execution processing 27. Further, when databases contained in the grouped database 10 are reorganized, data representing the structures of these reorganized databases are stored in the database-structure database 12 in correspondence with the respective databases by the database structure storage/readout control processing 26. Thus, the data stored in the database-structure database 12 are updated along with the reorganization of the sub-databases 10A contained in the grouped database 10.

The reorganization of the sub-databases 10A contained in the grouped database 10 can be carried out also by a reorganization instruction provided by the user. To this end, the database search system includes reorganization-instruction analysis processing 28 (implemented by a program).

A reorganization instruction given by the user is applied to the reorganization-instruction analysis processing 28, and the content of the reorganization instruction (namely into which collection of data sets, with particular specific classifications, the data base is to be partitioned) is analyzed by the reorganization-instruction analysis processing 28. The reorganization instruction provided by the user is analyzed by the reorganization-instruction analysis processing 28 and the analytical data are applied to the reorganization-instruction creation processing 40. The reorganization instruction data conforming to the reorganization instruction provided by the user are analyzed in the reorganization-instruction creation processing 40 and the database-structure database 12 and sub-databases 10A contained in the grouped database 10 are reorganized by the database structure storage/readout control processing 26 and reorganization execution processing 27.

Figure 3:
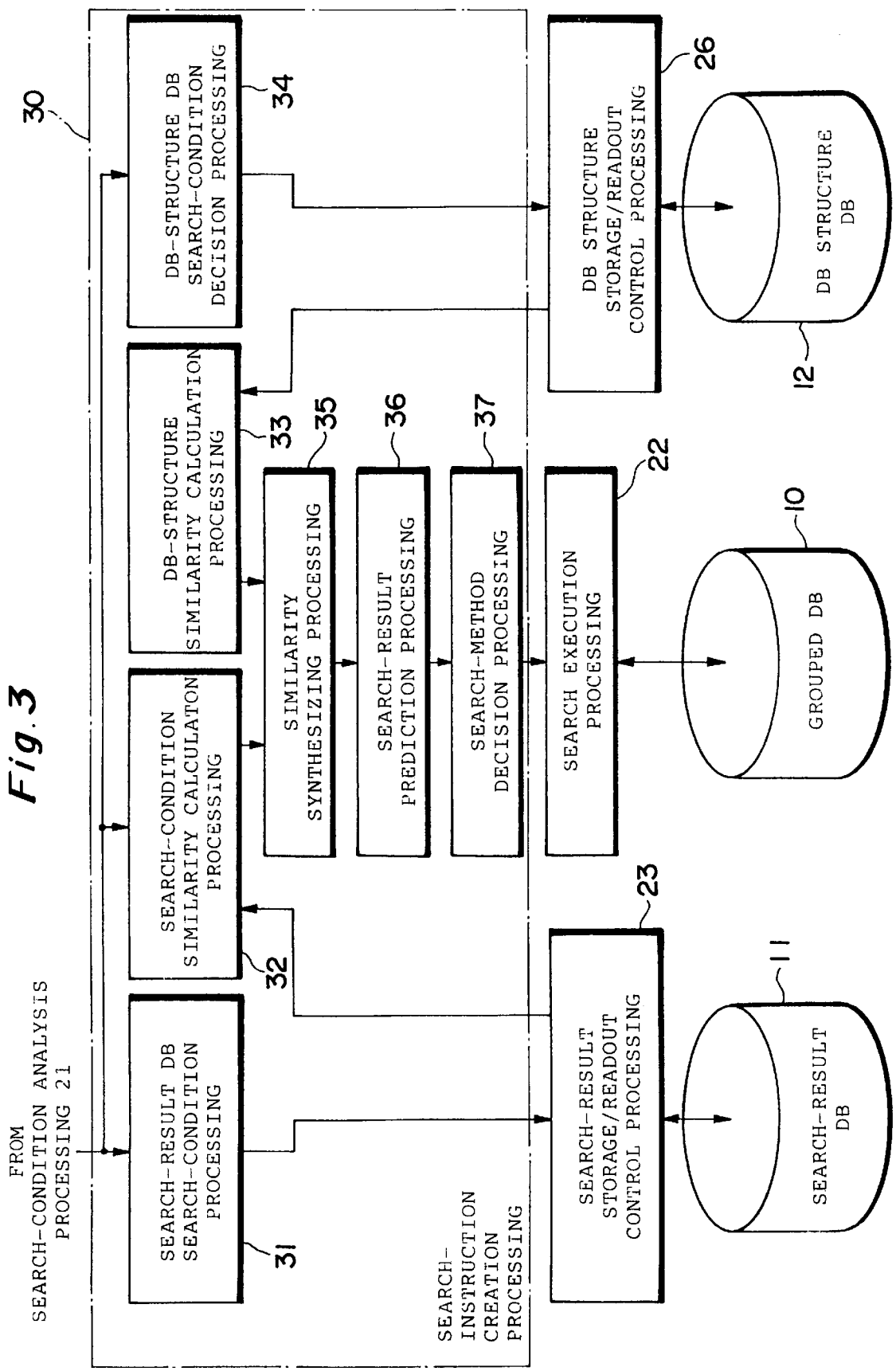
FIG. 3 illustrates the details of processing for creating search instructions.

FIG. 3 illustrates the details of the search-instruction creation processing 30.

In a case where a search based upon a search condition provided by the search-condition analysis processing 21 is conducted, the search-instruction creation processing 30 decides search methods, in correspondence with the individual databases of the plurality of sub-databases 10A contained in the grouped database 10, in such a manner that time required for the search is shortened. The search of the grouped database 10 is conducted by the search methods, which correspond to individual databases of the plurality of sub-databases 10A contained in the grouped database 10, decided by the search-instruction creation processing 30.

The data provided by the search-condition analysis processing 21 and representing the content of the search condition are applied to search-result database search-condition processing 31, search-condition similarity calculation processing 32 and database-structure database search-condition decision processing 34.

When the data representing the content of the search condition are applied to the search-result database search-condition processing 31, readout control data for reading out data, which have been stored in the search-result database 11, are created by the search-result database search-condition processing 31. The readout control data are applied to the search-result storage/readout control processing 23 and all of the data that have been stored in the search-result database 11 are read out in succession.

The data read out of the search-result database 11 are applied to the search-condition similarity calculation processing 32 via the search-result storage/readout control processing 23. The degree of similarity between the search condition provided by the search-condition analysis processing 21 and the search condition of each single search is calculated in the search-condition similarity calculation processing 32 with regard to all data that have been stored in the search-result database 11. This search-condition similarity calculation processing can be executed in accordance with database-structure similarity calculation processing, described later.

When the data representing the content of the search condition are provided by the search-condition analysis processing 21, readout control data are created in the database-structure database search-condition decision processing 34 in such a manner that the data of the latest database structure (these are data representing the structures of all sub-databases 10A contained in the grouped database 10) stored in the database-structure database 12 will be read out. The readout control data are applied to the database-structure database 12 via the database structure storage/readout control processing 26. As a result, the latest data of the data stored in the database-structure database 12 are read out. The latest data read out of the database-structure database 12 are applied to database-structure similarity calculation processing 33 via the database structure storage/readout control processing 26.

Further, data other than that of the latest database structure stored in the database-structure database 12 also are read out successively and applied to the database-structure similarity calculation processing 33.

The database-structure similarity calculation processing 33 calculates the degree of similarity between the data of the latest database structure stored in the database-structure database 12 and the data of other database structures. In other words, the database-structure degree of similarity between the structure of a database contained in the grouped database 10 and a database structure represented by the database structure data stored in the database-structure database 12 is calculated by the database-structure similarity calculation processing 33. The details of processing for calculating the database-structure degree of similarity will be described later.

The search-condition degree of similarity calculated in the search-condition similarity calculation processing 32 and the database-structure degree of similarity calculated in the database-structure similarity calculation processing 33 are each applied to similarity synthesizing processing 35. Mixing (which can be carried out based upon an algebraic product or logical product) of the search-condition degree of similarity and the database-structure degree of similarity is performed in the similarity synthesizing processing 35.

The synthesized degree of similarity is applied to search-result prediction processing 36. In the databases contained in the current grouped database 10, the pertinent number of cases of the data conforming to the search condition provided by the user and the time required for the search conforming to the search method are predicted, for each search method, in the search-result prediction processing 36. The predicted pertinent number of cases and the time required for the search for each search method in the search-result prediction processing 36 are applied to search-method decision processing 37.

A search method for a data search is decided by the search-method decision processing 37 for every sub-database 10A in the grouped database 10 in such a manner that the time required for a data search of the grouped database 10 is shortened. The data representing the search method decided is applied to the search execution processing 22 and the data search is conducted using the search method decided for every sub-database 10A contained in the grouped database 10.

Appropriate search methods decided in correspondence with the sub-databases 10A contained in the grouped database 10 are decided and the data search is conducted using the search methods decided. As a result, the time required for the data search is shortened.

FIG. 4 illustrates the details of database-characteristic analysis processing.

In database-characteristic analysis processing 25, a data exchange is performed between a database-structure characteristic common-knowledge database 45 which stores general knowledge relating to the database structure and a database-structure characteristic comparative-knowledge database 46 which compares with the other database structure.

The following rules are stored in the database-structure characteristic common-knowledge database 45, by way of example:

Rule 1: If a user search condition frequently uses classifications which are few in type and grouping is performed by such classification, then a specific classification extracted with this database structure will be fairly good.

Rule 2: If a user search condition frequently uses classifications of many types and grouping is performed by such classification, then a specific classification extracted with this database structure will not be too good.

Rule 3: If there is a threshold value of a specific-classification range extracted where there are many types, then the setting of the specific-classification range extracted with this database structure will be slightly unsatisfactory.

Rule 4: If a large amount of memory capacity is used, then a specific classification extracted with this database structure will not be very good.

The following rules are stored in the database-structure characteristic comparative-knowledge database 46, by way of example:

Rule 1: If there are a plurality of database structures grouped by similar specific classifications and mean search time is shorter than that of other database structures, then these database structures will be good.

Rule 2: If there are a plurality of database structures grouped by similar specific classifications and database structures grouped even by other specific classifications have a shorter mean search time, then these database structures will lack extracted specific classifications.

Rule 3: If there are a plurality of database structures grouped solely by similar specific classifications and other database structures have a shorter mean search time, then these database structures will be unsatisfactory in terms of the setting of the specific-classification range that has been extracted.

Rule 4: If there are a plurality of database structures having similar mean search times and other database structures use less memory capacity, then a specific classification extracted with these database structures will not be very good.

Among the data that have been stored in the search-result database 11, data representing the results of searching the databases contained in the grouped database 10 are read out of the search-result database 11 by the search-result storage/readout control processing 23. The data read out are applied to the database-characteristic analysis processing 25 via the search-result storage/readout control processing 23.

The data applied to the database-characteristic analysis processing 25 representing the results of searching the databases contained in the grouped database 10 are applied to database-structure characteristic general judgment processing 43 and database-structure characteristic comparative judgment processing 44.

The rules that have been stored in the database-structure characteristic common-knowledge database 45 are applied to the database-structure characteristic general discrimination processing 43 as well. The degree of conformity of the general characteristics of the databases in the sub-databases 10A contained in the grouped database 10 is discriminated in the database-structure characteristic general discrimination processing 43 on the basis of the rules that have been stored in the database-structure characteristic common-knowledge database 45. The degree of conformity representing the result of discrimination is applied to summing synthesis processing 41 and 42.

The rules that have been stored in the database-structure characteristic comparative-knowledge database 46 are applied to the database-structure characteristic comparative judgment processing 44 as well. The degree of conformity of the database comparative comparison characteristics in the sub-databases 10A contained in the grouped database 10 is discriminated in the database-structure characteristic comparative judgment processing 44 on the basis of the rules that have been stored in the database-structure characteristic comparative-knowledge database 46. The degree of conformity representing the result of discrimination also is applied to the summing synthesis processing 41 and 42.

Processing for summing the degrees of conformity each of which have been provided with a prescribed weighting is performed in the summing synthesis processing 41 and 41. The degree of conformity obtained from the summing synthesis processing 41 is applied to reorganization-instruction creation processing 40 as subdivided-item degree of conformity representing the suitability of specific classifications of sub-databases 10A contained in the grouped database 10, and the degree of conformity obtained by the summing synthesis processing 42 is applied to the reorganization-instruction creation processing 40 as a subdivided-range degree of conformity representing the suitability of a range of classifications (e.g., annual income greater than 10,000,000 yens and less than 20,000,000 yen) of the sub-databases 10A contained in the grouped database 10.

Whether the sub-databases 10A contained in the grouped database 10 are to be reorganized is determined in the reorganization-instruction creation processing 40 based upon the subdivided-item degree of conformity and subdivided-range degree of conformity provided by the database-characteristic analysis processing 25. If reorganization is necessary, the reorganization-instruction creation processing 40 creates a reorganization instruction and updates the data contained in the grouped database 10.

The determination regarding reorganization is performed in accordance with the following conditions, by way of example:

Rule 1: In a case where the present subdivided-item degree of conformity and subdivided-range degree of conformity are both sufficiently high, the database structure must not be reorganized.

Rule 2: In a case where the present subdivided-item degree of conformity is sufficiently high and the subdivided-range degree of conformity is low, the specific classification range extracted in a statistical analytical manner (in the manner of a technique for finding a maximum value) is reorganized.

Rule 3: In a case where a database structure in which the present subdivided-item degree of conformity is low and the other subdivided-item degrees of conformity are high exists, the specific classification to be extracted is changed and the specific classification range extracted in a statistical analytical manner (in the manner of a technique for finding a maximum value) is reorganized.

Rule 4: In a case where a database structure in which the present subdivided-item degree of conformity is low and the other subdivided-item degrees of conformity are high does not exist, the database characteristic is analyzed and a specific classification extracted by a statistical technique is set.

Figure 10:
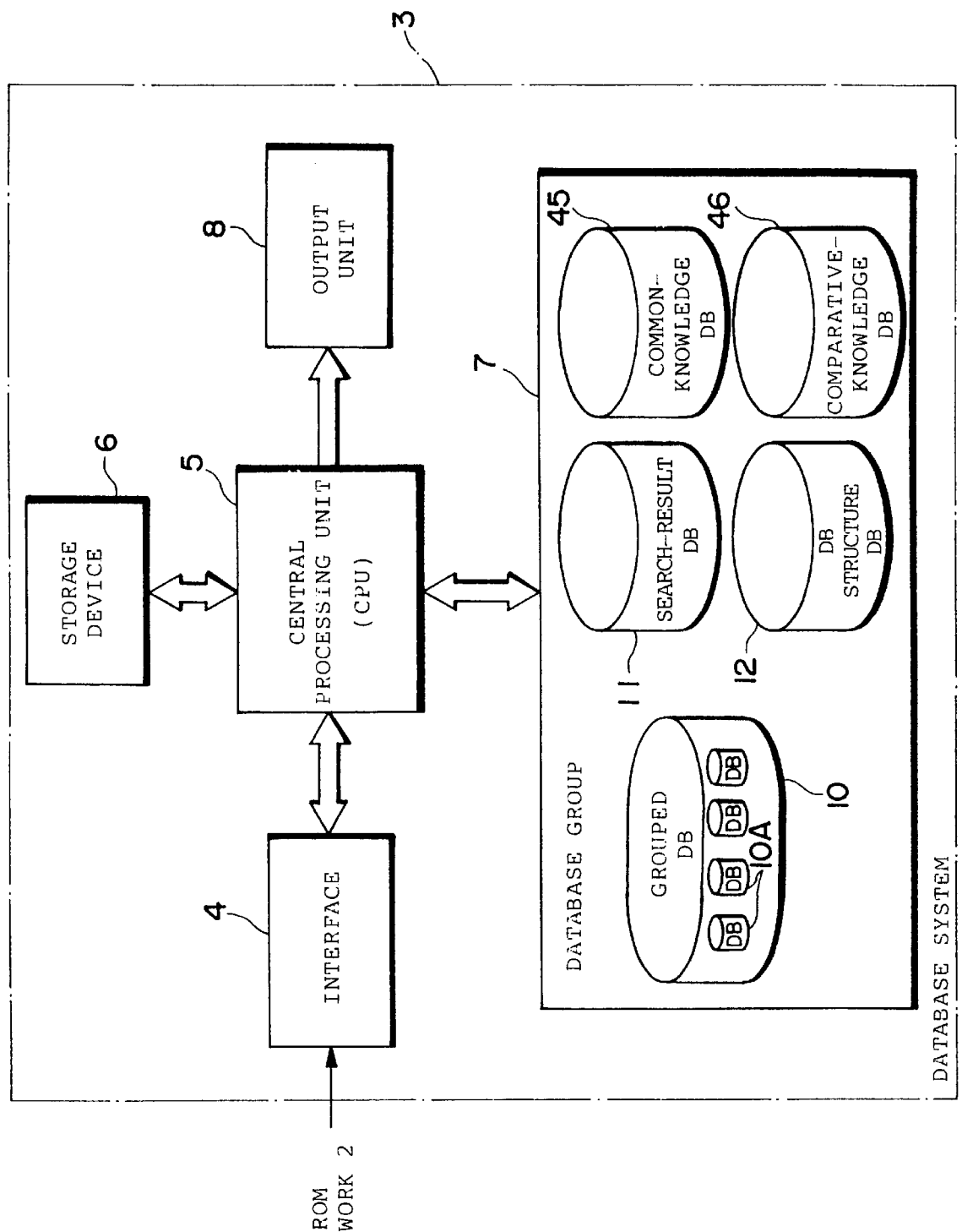
FIG. 10 illustrates the hardware configuration of a database system.

FIG. 10 illustrates the hardware configuration of the database system 3 shown in FIG. 1 (the details of which are depicted in FIGS. 2 and 3). The database system is implemented by a computer system.

The database system 3 includes a central processing unit (CPU) 5 which executes processing for analyzing data, processing for creating data, etc. Connected to the central processing unit 5 are an interface 4 for accepting data provided by a terminal device via a bus and outputting retrieved data to the terminal device, a storage device 6 which supplies a program area in which a program executed by the central processing unit 5 is stored, a working area and a buffer area, etc., for various calculations, a database group (memory unit) 7 which includes various databases for storing data, and an output unit (a CRT display device, a printer, a data writing device for writing data in a magnetic disk, etc.) 3 for outputting data in a visible or machine-readable manner.

More specifically, the storage device 6 is implemented by a RAM and a ROM, etc., and the memory unit is implemented by a hard disk, magnetic tape, etc.

The database group 7 includes the above-mentioned grouped database 10, search-result database 11, database-structure database 12, database-structure characteristic common-knowledge database 45 and database-structure characteristic comparative-knowledge database 46.

In accordance with a preset program, the central processing unit 5 executes the search-condition analysis processing 21, search execution processing 22, search-result storage/readout control processing 23, search-result analysis processing 24, database-characteristic analysis processing 25, database structure storage/readout control processing 26, reorganization execution processing 27, reorganization-instruction analysis processing 28, search-instruction creation processing 30 and reorganization-instruction creation processing 40.

Figure 11:
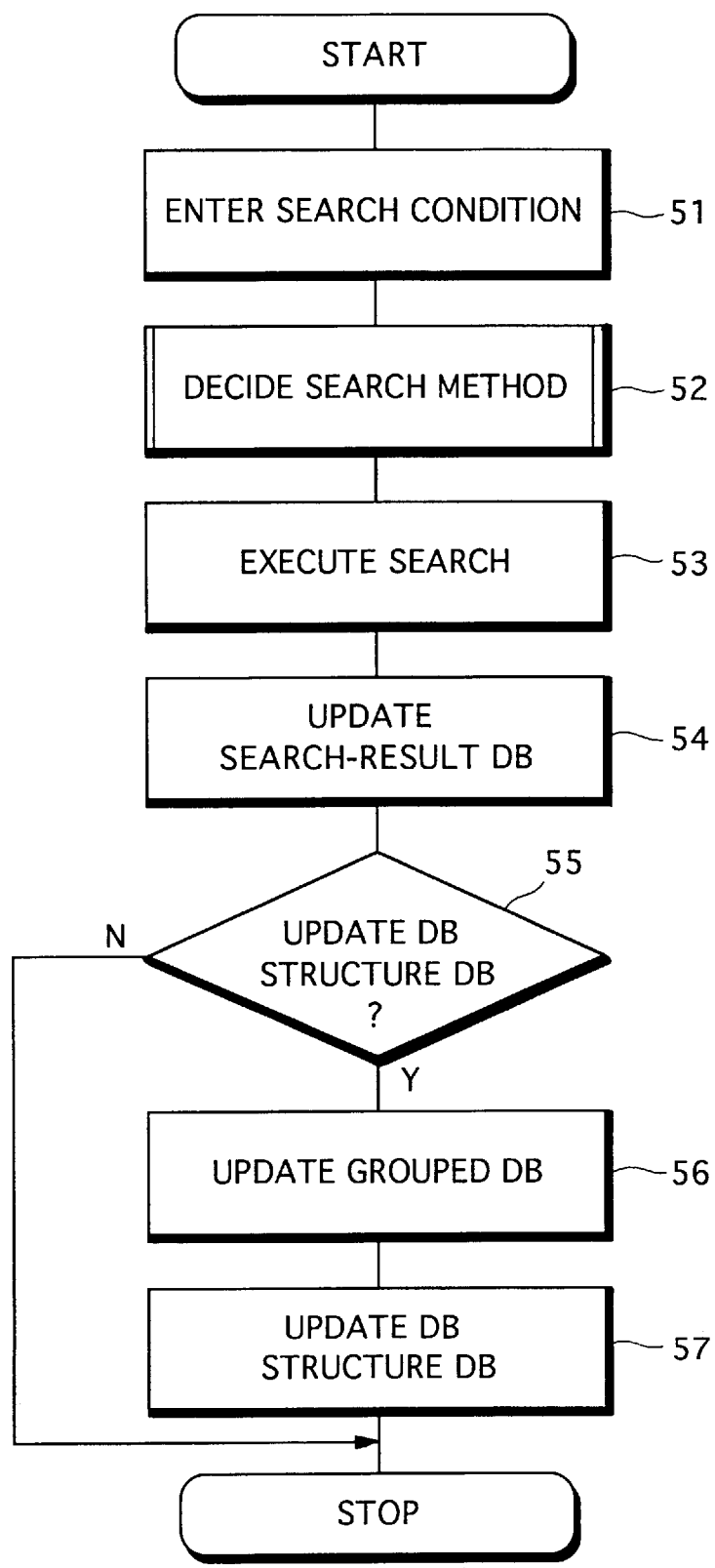
FIG. 11 illustrates a processing procedure when a search condition has been given by a user.

FIG. 11 illustrates a processing procedure executed when a search condition has been given by a user. This processing is executed by the central processing unit 5.

The search condition from the user is applied to the search-condition analysis processing 21 via the interface 4 and the analyzed content thereof is applied to the search-instruction creation processing 30 (step 51). The optimum search method is decided in the search-instruction creation processing 30 for each of the plurality of sub-databases 10A contained in the grouped database 10 (step 52). The databases contained in the grouped database 10 are searched using the decided search methods in the search execution processing 22 (step 53).

When searching of the sub-databases 10A contained in the grouped database 10 is finished, the data representing the search condition and search results, etc., are applied to the search-result database 11, which is thus updated (step 54).

Next, it is determined in database-characteristic analysis processing 25 whether the structure of a sub-database 10A contained in the present grouped database 10 is appropriate (step 55). If the structure of the present sub-database is appropriate, the database contained in the present grouped database 10 is not reorganized and the database-structure database 12 is not updated either (NO at step 55). When the present database is not appropriate, the sub-database contained in the present grouped database 10 is reorganized and this is accompanied by updating of the database-structure database 12 as well (YES at step 55; steps 56, 57).

For example, assume that the present database structure comprises a sub-database which consists of a data set having the classification data "male" in common, as shown in FIG. 8a, a sub-database which consists of a data set having the classification data "female" in common, as shown in FIG. 8b, and a sub-database which consists of a data set having the classification data "annual income of 20,000,000 yen or more" in common, as shown in FIG. 8c.

When a search condition specifying that all classification data "male" is to be searched is applied under these circumstances, the sub-database in which the data shown in FIG. 8a have been stored is utilized and all of the data stored in this data are retrieved and outputted by, say, a sequential search. When a search condition specifying that all classification data "annual income of 30,000,000 yen or more" is to be searched is applied, the sub-database in which the data shown in FIG. 8c have been stored is utilized and, of the data that have been stored in this data, all of the data having the classification data "annual income of 30,000,000 yen or more" are retrieved and outputted by, say, a sequential search.

When a search condition specifying that all classification data "annual income of 10,000,000 yen or more" is to be searched is applied, a search omission occurs with the sub-database in which the data shown in FIG. 8c have been stored. Accordingly, the data shown in FIGS. 8a and 8b (since these data are data having the classification data "male" and "female", they include all of the original data) are searched by a sequential search and the pertinent data are retrieved and outputted.

Further, if the frequency of application of the search condition specifying that all classification data "annual income of 10,000,000 yen or more" is to be searched is high and the frequency of application of the search condition specifying that all classification data "annual income of 20,000,000 yen or more" is to be searched is low, the sub-database structure is reorganized in such a manner that the sub-database in which the data shown in FIG. 8c have been stored will be constituted by data having the classification data "annual income of 10,000,000 yen or more", as illustrated in FIG. 9c.

Figure 12:
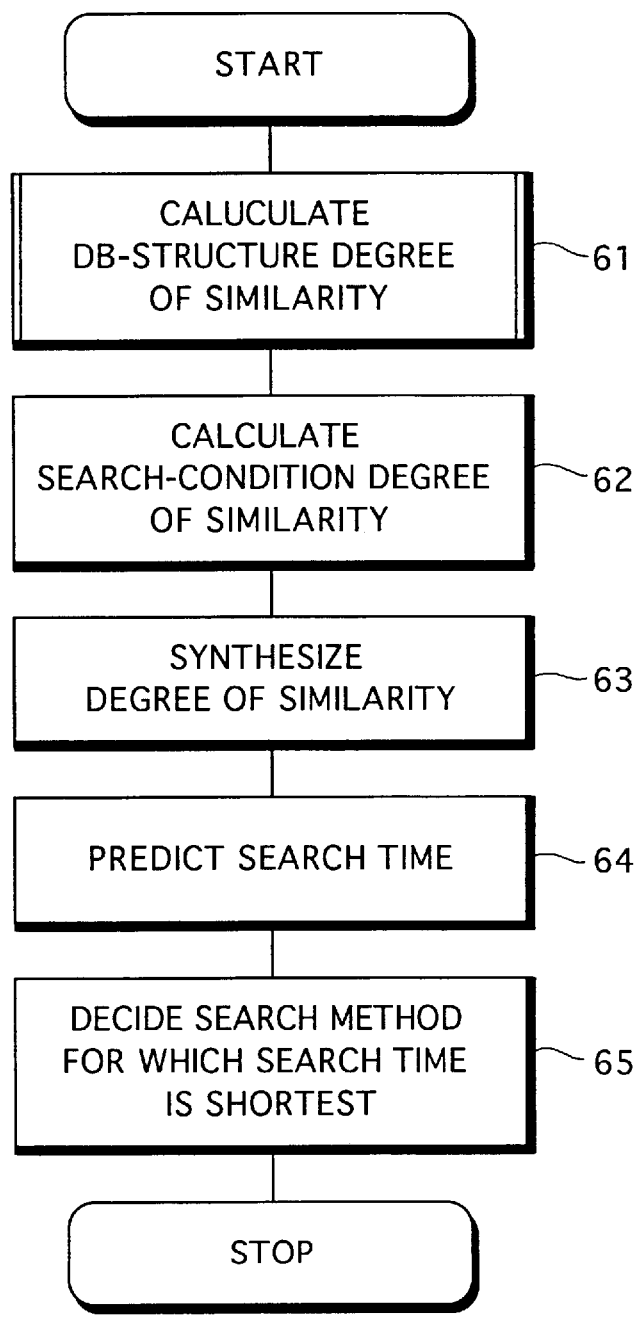
FIG. 12 illustrates a processing procedure for deciding a method of searching a database contained in a grouped database.

FIG. 12 illustrates a processing procedure for deciding a search method decided for each sub-database 10A, contained in the grouped database 10, in dependence upon the search condition provided by the user. This processing also is executed by the central processing unit 5.

First, the database-structure degree of similarity between the structure of the present sub-database 10A contained in the grouped database 10 and a database structure that has been stored in the database-structure database 12 is calculated (step 61). The details of this processing for calculating the database-structure degree of similarity will be described later. Next, the search-condition degree of similarity between the search condition provided by the user and a search condition that has been stored in the search-result database 11 is calculated (step 62). The calculated database degree of similarity and search-condition degree of similarity are combined (step 63).

The search time associated with a sub-database 10A contained in the present grouped database 10 is predicted in correspondence with various search methods (step 64).

A search method for which the predicted search time is short and the degree of similarity obtained by combination is high is decided for each database contained in the grouped database 10 (step 65).

Figure 13A:
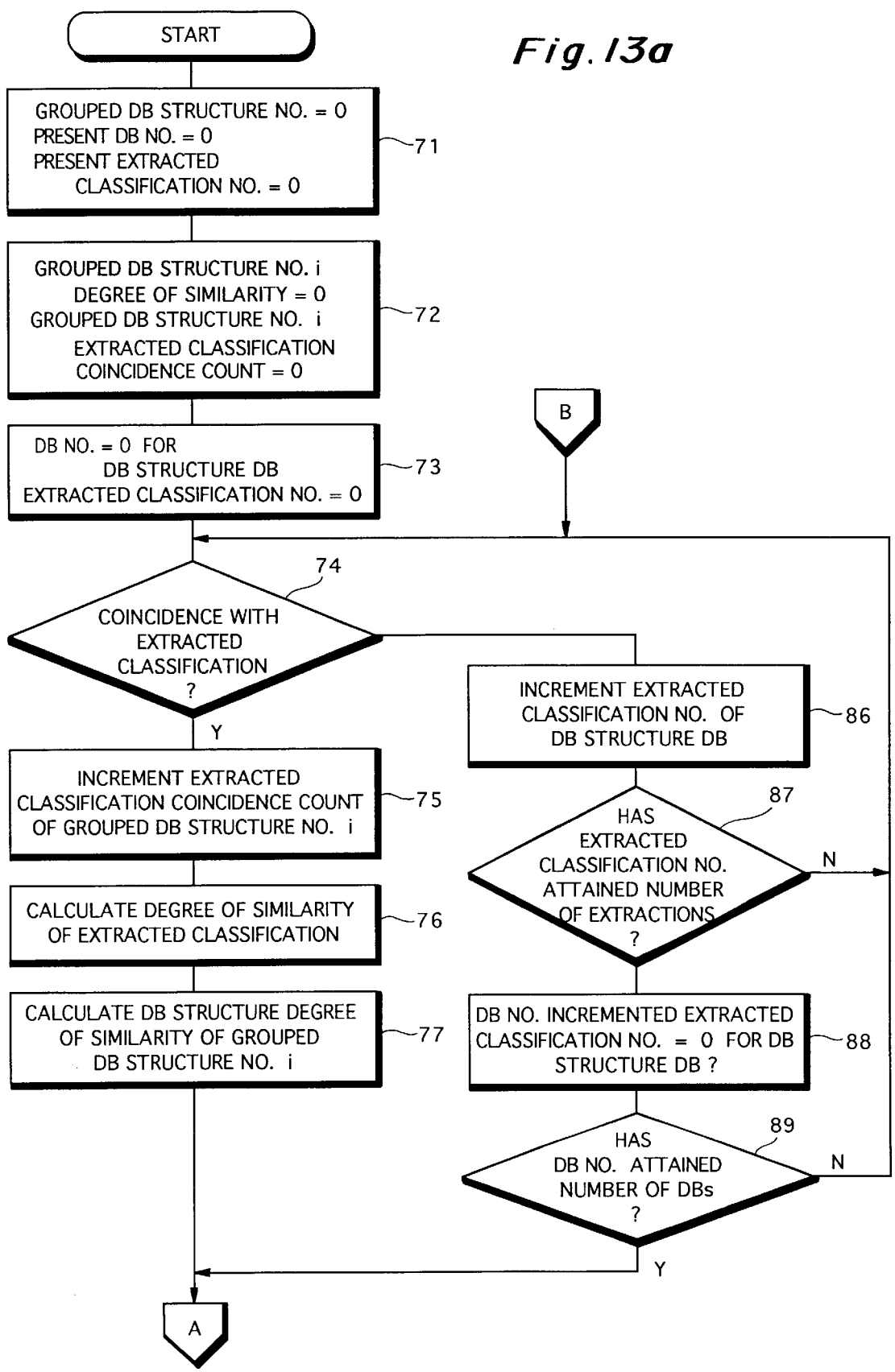
FIG. 13 illustrates part of a processing procedure for calculating the degree of similarity of database structures.
Figure 13B:
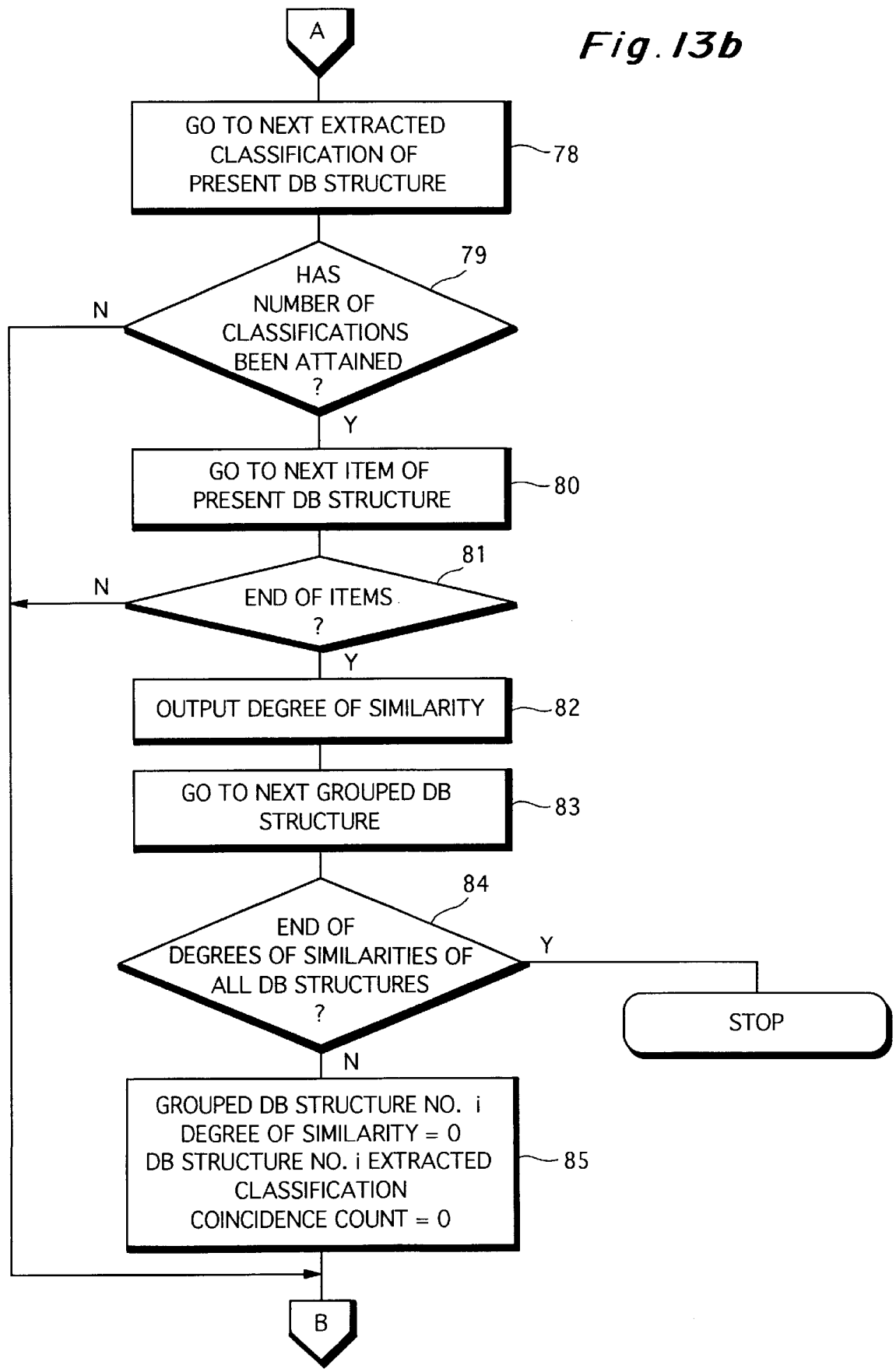

FIGS. 13 and 14 illustrate the procedure of processing for calculating database degree of similarity. This processing also is executed by the central processing unit 5.

The database degree of similarity is calculated with regard to the database structure of the present database of grouped database 10 and all database structures of the structures of the reorganized sub-databases 10A, which are the sub-databases 10A that were included in the grouped database 10, stored in the database-structure database 12.

The database structure degree of similarity is calculated for each database structure which represents the structure of a sub-database 10A contained in the grouped database 10. As shown in FIG. 7, the database structure includes database structures in correspondence with the number of sub-databases contained in the grouped database 10. Stored in each database structure are extracted specific classifications (extracted classifications) indicating classifications having in common a data set that has been stored in the database, and an extracted specific-classification range (extracted classification range).

The number of times coincidence is achieved between an extracted classification or extracted classification range and a database extracted classification or extracted-classification range contained in the grouped database 10 is calculated, for each database structure, with regard to all database structures of the grouped-database structures, and the grouped-database structure degree of similarity is calculated on the basis of the number of times coincidence is achieved.

With reference to FIGS. 13 and 7, the Grouped DB No., DB Structure No. and Subdivision No. are each reset (step 71). Further, the DB structure degree of similarity and the number of times coincidence is achieved with regard to the extracted classification or extracted-classification range of the database structure data having the DB Structure No. i whose database structure degree of similarity is to be calculated are each reset (step 72).

Next, the DB No. and the Extracted Classification No. of the database-structure database 12 are reset (step 73). First, it is determined whether coincidence has been achieved with regard to the first extracted classification or extracted-classification range at DB Structure No. 0 (step 74). If coincidence is achieved (YES at step 74), then the number of times coincidence has been achieved with regard to the extracted classification of grouped DB Structure No. 0 is incremented (step 75) and the degree of similarity of this extracted classification is calculated (step 76). The degree of similarity of this extracted classification can be calculated by providing a degree-of-similarity table with regard to discrete extracted classifications (e.g., sex) or based upon degree of similarity in well-known fuzzy sets with regard to a continuous extracted-classification range.

Next, the degrees of similarity of the extracted classifications are summed, the DB structure degree of similarity of the Grouped DB Structure No. i is calculated (step 77) and the number of extracted classifications is incremented so as to calculate the degree of similarity of the next extracted classification (step 78).

It is determined whether the number of extracted classifications contained in the DB structure has been attained (step 79). If the number of classifications has not been attained, processing from step 74 onward is repeated.

If the extracted classification or extracted-range classification of the grouped database 10 and the extracted classification or extracted-range classification of the DB structure do not coincide, the Extracted Classification No. of the databases of grouped database 10 is incremented (step 86) and it is determined whether the Extracted Classification No. has attained the number of extracted classifications of the grouped database 10 (step 87). If there is no coincidence with regard to the number of extracted classifications of the grouped database 10, then the processing from step 74 onward is repeated. If coincidence is achieved with regard to the number of extracted classifications (YES at step 87), the processing from step 74 onward is repeated with regard to the next database structure contained in the grouped database 10 (steps 88, 89).

If calculation of the degree of similarity of extracted classifications is finished with regard to all extracted classifications or the number of extracted classifications contained in the database structure (YES at step 79), then the degree of similarity of this condition is calculated for each extracted classification or extracted-classification range with regard to the next database structure and the degree of similarity of the database structure is calculated. If calculation of the degrees of similarity of all database structures contained in the grouped database structure is finished (NO step 81), then the degree of similarity of the grouped database structure is outputted (step 82) and processing for calculating the degree of similarity of the next grouped database structure is performed (steps 83, 84). When the degree of similarity of the next grouped database structure is calculated, the degree of similarity and the number of times coincidence has been achieved with regard to the extracted classification are reset (step 85).

The degree of similarity of the search condition is calculated in the same manner as the degree of similarity of the database structure. The degrees of similarity between individual designated classifications contained in an applied search condition and individual classifications stored as search conditions in the search-result database 11 are calculated in dependence upon coincidence or approximation (how approximate in case of approximation). Thus, the degree of similarity of the search condition is calculated, this is combined with the database degree of similarity, as mentioned above, and the synthesized degree of similarity is obtained.

What is claimed is:

1. A database search method comprising the steps of:

searching a database, in which there is stored a data set containing an identification code and including classification data on an item-by-item basis, by giving a search condition which designates the classification of the data set and using a predetermined search method decided by the given search condition and the structure of the database;

successively storing, whenever a search is conducted, the search condition, search method and time required for a search when a search is conducted;

calculating degrees of similarity between a given search condition and stored search conditions when a search condition has been given;

reading out a search method used when search time, required when a search was conducted under a search condition having a high calculated degree of similarity, is short; and searching said database by the search method read out and outputting said identification code of the data set having classification data conforming to the search condition.

2. A database search method for a case where there are one or a plurality of sub-databases, created based upon an original database comprising a collection of data sets containing identification codes and including classification data on an item-by-item basis, comprising a collection of data sets having a specific classification in common, wherein the sub-databases are reorganized, comprising the steps of:

storing designated classifications contained in a search condition, search methods and times required for the searches whenever the search condition, which designates one or a plurality of classifications to be searched, is given;

calculating degrees of similarity between designated classifications having a high frequency of occurrence among the stored designated classifications and a specific classification common to the sub-databases;

in a case where there is a designated classification among the designated classifications having a high frequency of occurrence that exhibits a low degree of similarity with regard to any specific classification, creating a sub-database comprising a collection of data sets having this designated classification in common;

storing a specific classification common to sub-databases whenever a sub-database is created;

calculating designated-classification degrees of similarity between a designated classification contained in a given search condition and designated classifications that have been stored;

calculating specific-classification degrees of similarity between a specific classification of a sub-database and specific classifications that have been stored;

conducting a search of said sub-database by a search method used when the designated-classification degree of similarity and the specific-classification degree of similarity are high and the time required when a search was conducted at such time is short, and outputting said identification number of the data set having classification data conforming to the search condition.

3. A database search apparatus comprising:

database searching means for searching a database, in which there is stored a data set containing an identification code and including classification data on an item-by-item basis, by giving a search condition which designates the classification of said data set and using a predetermined search method decided by the given search condition and the structure of said database;

memory means for successively storing, whenever a search is conducted, the search condition, search method and time required for a search when a search is conducted by said database search means;

similarity calculating means for calculating degrees of similarity between a given search condition and search conditions, which have been stored in said memory means, when a search condition has been given;

search-method readout means for reading out a search method used when search time, required when a search was conducted under a search condition having a high degree of similarity calculated by said similarity calculating means, is short; and identification-code output means for searching said database by the search method read out by said search-method readout means and outputting said identification code of the database having classification data conforming to the search condition.

4. A database search apparatus for searching one or a plurality of sub-databases, created based upon an original database comprising a collection of data sets containing identification codes and including classification data on an item-by-item basis, comprising a collection of data sets having a specific classification in common, comprising:

an input unit for accepting a search condition designating one or a plurality of classifications to be searched;

first memory means for storing designated classifications contained in a search condition, search methods and times required for the searches whenever the search condition is accepted by said input unit;

first similarity calculating means for calculating degrees of similarity between designated classifications having a high frequency of occurrence among the designated classifications stored in said first memory means and a specific classification common to the sub-databases;

determination means for determining whether the designated classifications having a high frequency of occurrence include a designated classification that exhibits a low degree of similarity with regard to any specific classification in the degrees of similarity calculated by said first similarity calculating means;

sub-database creating means which, when it has been determined by said determination means that the designated classifications having a high frequency of occurrence include a designated classification exhibiting a low degree of similarity with regard to any specific classification, is for creating a sub-database comprising a collection of data sets having this designated classification in common;

second memory means for storing a specific classification common to sub-databases whenever a sub-database is created by said sub-database creating means;

second similarity calculating means for calculating degrees of similarity between a designated classification contained in a search condition entered by said input unit and designated classifications that have been stored in said first memory means;

third similarity calculating means for calculating degrees of similarity between a specific classification of a sub-database and specific classifications that have been stored in said second memory means; and identification-number output means for conducting a search of said sub-database by a search method used when a designated-classification degree of similarity calculated by said second similarity calculating means and a specific-classification degree of similarity calculated by said third similarity calculating means are high and the time required when a search was conducted at such time is short, and outputting said identification number of the data set having classification data conforming to the search condition.

\* \* \* \* \*

UNITED STATES PATENT AND TRADEMARK OFFICE
CERTIFICATE OF CORRECTION

PATENT NO.    :  5,812,998
DATED         :  9/22/98
INVENTOR(S) :   Tsutsumi et al.

It is certified that error appears in the above-identified patent and that said Letters Patent is hereby corrected as shown below:

In column 6, line 39, change "13" to --13a--.

In column 6, line 42, change "14" to --13b--.

In column 15, line 44, change "13" to --13a-- and change "14" to --13b--.

In column 16, line 5, change "13" to --13a--.

Signed and Sealed this

Twenty-ninth Day of June, 1999

Attest:

Q. TODD DICKINSON

*Attesting Officer*   Acting Commissioner of Patents and Trademarks